Patented Mar. 10, 1931

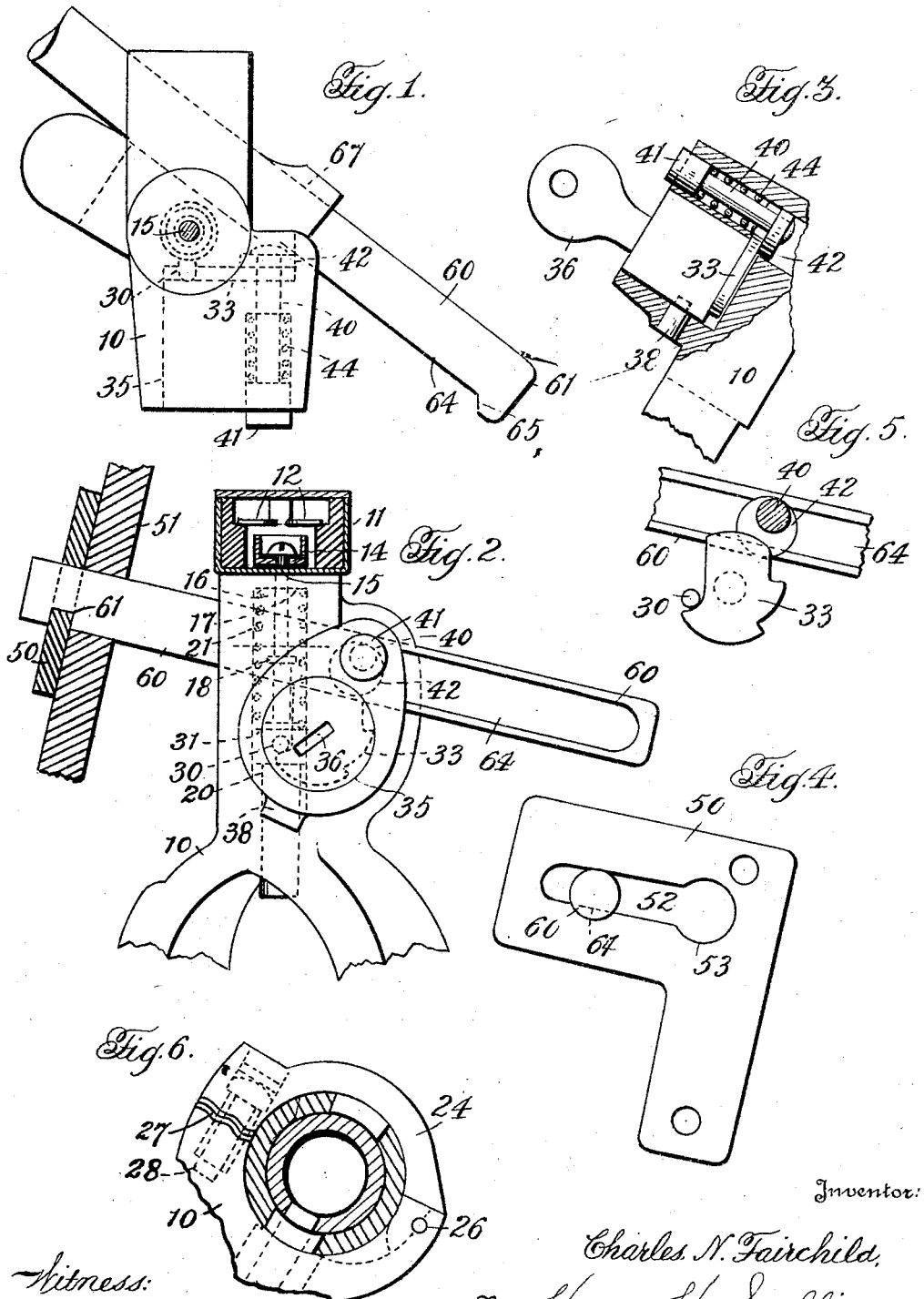

1,795,547

UNITED STATES PATENT OFFICE

CHARLES N. FAIRCHILD, OF NEW HAVEN, CONNECTICUT, ASSIGNOR TO FAIRCHILD LOCK CORPORATION, OF NEW YORK, N. Y., A CORPORATION OF DELAWARE

ADJUSTABLE STEERING-POST LOCK

Application filed March 2, 1927. Serial No. 172,115.

This invention relates to locks and has for its principal object the provision of a lock which can be secured to a steering post casing, for example, and serving to lock the steering post or tube to the casing and yet permit of the steering post assembly being removed as a whole from the automobile for repairs.

At the present time all steering posts locks are permanently secured to some fixed portion of the automobile for the obvious reason that if they were not then a thief could cut the steering post casing just beneath the lock and steer the automobile with the wheel in the usual manner since only the top portion of the cut tube would be locked to the steering shaft or tube. A serious objection naturally arises in case it is necessary to remove the steering post assembly from the vehicle, since in this case it is as difficult for the automobile mechanic to remove the lock as it would be for the thief to, and as a natural consequence the post cannot be removed.

In the present invention the steering post locking housing is permanently secured to the steering post casing as customary, but it is not permanently secured to any fixed part of the automobile, but on the contrary, a detachable link is provided which may be made removable from the dash and lock housing both, or if desired may be removable from only the housing and provision is made whereby the locking of the car locks the housing with respect to the dash or other fixed part, but permitting ready removal of the entire steering post assembly whenever desired.

A still further object of the invention is the provision of a simple and efficient steering post lock which may be used on what is known as adjustable steering posts wherein the assembly is pivoted and held in adjusted position by means of a bracket so that a fat driver, for example, may move the steering post further away from the seat, giving him more room. This type of steering post is now on the market in a few cars and gives promise of continued success so it is essential that some means be provided whereby the steering post lock may accommodate this movement.

In the drawings:—

Figure 1 is a view looking down the axis of the steering post locking bolt.

Fig. 2 is a view at right angles thereto.

Fig. 3 is a section taken through the axes of the plunger and lock casing.

Fig. 4 is a view of a plate which may be used to secure the connecting link to the dash or other fixed part of the car, this view also showing the connecting link.

Fig. 5 is a view of the connection between the cam, the plunger, and the connecting rod.

Fig. 6 is a fragmentary view showing the hinged connection between the sections of the lock housing and their relation to the steering post casing and the steering post tube.

The lock housing is indicated generally at 10 and is of approximately the type shown in my Patent No. 1,592,091, July 13, 1926, including at its top a switch box 11 having a plurality of contacts 12 which are bridged by a cup-shaped contact 14 carried by but insulated from a stem 15 which is yieldingly held downwardly by a spring 16 which surrounds the stem 15 between the shoulder 17 and the head 18. The locking bolt is indicated at 20 and passes in the usual fashion through a boss 22 integral with a larger part of the housing 10. A similar boss 23 is integrally carried by the housing cap 24 which in this particular embodiment is hinged to the main portion of the housing as by a pin 26, the free end being corrugated as at 27 and permanently closed by a one-way screw 28. A pin 30 carried by the head 31 of the locking bolt 20 is engaged by a cam 33 secured to the revolving cylinder of the lock 35 which is operated by a key such as 36. The lock casing 35 is snugly received in a bore in the housing and is secured in place as by a pin 38.

In general the parts described thus far are old and well known and form no part of the invention, per se, the invention being limited to the combination of a lock of this type with means for releasably locking the housing to a fixed portion of the automobile.

Referring particularly to Fig. 3, to one side of the lock cylinder and somewhat above and to the right as seen in Fig. 2, there is a plunger 40 having a finger piece 41, and at the opposite end a washer 42 which may conveniently be a disc mounted eccentrically on the stem of the plunger 40. A spring 44 yieldably holds the thumb piece 41 elevated quite appreciably and holds the washer 42 in the path of the cam 33 which raises the locking bolt. In Fig. 3 the plunger is shown depressed which carries the washer below the cam 33 which, therefore, can be turned by means of the key 36 so as to raise the locking bolt. Such action, however, locks the washer in the position shown in Fig. 3, as the spring holds the washer against the bottom face of the cam.

A plate such as 50 is permanently secured to the engine side of the instrument board 51 and serves to hold a connecting link 60 either non-removably as indicated, or if desired, by placing a head on the connecting link, the entire link may be readily removed by passing it forwardly with respect to the automobile through the dash of the instrument board, the direction of course, being in the direction of the engine. For many reasons I prefer to have the link relatively permanently attached to the dash and therefore provide a key-hole slot 52 the round portion 53 of which snugly receives the cylindrical rod 60 which is milled at 61 so as to slide with slight clearance in the narrower portion of the key-hole slot. In Fig. 4 the view is taken from the back portion of the instrument board and the rod or connecting link 60 is therefore seen as a circle. The connecting rod is milled as at 64, leaving a shoulder 65 rather near the free end 66 and the other shoulder being as near the head or portion secured to the dash as will permit the most erect position of the steering post assembly.

Referring particularly to Fig. 1, it will be seen the housing 10 is provided with a cylindrical bore 67 which rather snugly receives the rod or link 60 so that as the steering post, assuming for a moment that it is adjustable, swings about its pivot the end of the link will slide up and down in the key-hole slot 52 but will not have any play in the housing 10. In the locked position shown in Fig. 1 the corner of the washer 42 locks the link 60 in place so that the link cannot be removed from the housing. In unlocked position, however, the spring 44 slidably holds the washer 42 so that it clears the bore which receives the link 60 so that there is no obstacle to the complete sliding of the link out of the housing when the locking bolt is in unlocked position. As a matter of fact in strict accuracy the link is not slid out of the housing but the housing is moved away from the dash so as to completely withdraw the link from the housing. If the plate is of the form shown in Fig. 4 the link may be removed from the dash when the housing and link have been disassociated but some manufacturers will prefer that the link shall not be removable from the fixed part of the automobile.

When the steering post is locked, however, by discharge of the locking bolt 20 by its spring 21, which is accomplished by turning the key 36 so as to bring the cam into the position shown in Fig. 2, the washer 42 projects into the milled away portion 64 of the link 60 and this absolutely bars removal of the link, which can move with respect to the housing only between the two shoulders. It might be well to mention again that the key cannot be rotated to locking position without first depressing the thumb piece 41, as otherwise the cam will be arrested by engagement with the washer 42. To unlock the car the key is inserted in its key-hole, the cylinder turned to raise the locking bolt, and just as soon as the washer 42 is freed, the spring 40 will snap the plunger back into normal position, in which position the link may be withdrawn from the housing.

What I claim is:—

1. In a coincidental lock, a revolving lock barrel, a locking bolt, a member resiliently held in normal position in which it prevents movement of the locking bolt in a forward direction to locking position, means for holding said member out of said normal position when the locking bolt is in locked position, and means for preventing backward movement of the lock barrel from running position to locked position.

2. In a key operated coincidental lock having a revolving lock barrel and a locking bolt, a member spring-pressed into normal position in which said member prevents movement of the lock barrel forward to locking position, means for holding said member out of said normal position when the bolt is in locked position, and ratchet means for preventing backward or reverse movement of the lock barrel from running position to locked position.

3. In a locking device, a housing movable with respect to a relatively stationary object, a bolt in said housing, means for advancing and retracting said bolt, a member resiliently held in normal position in which said member prevents movement of the bolt to locking position, means for holding said member out of said normal position when the bolt is in locked position, and means for detachably connecting said lock housing with said relatively stationary object, said member preventing removal of said connecting means when the bolt is in locked position.

4. In an automobile, a member fixed with respect to the frame thereof, a housing movable with respect to said member, a steering post, means within said housing for locking said steering post against turning and locking said housing against movement away from said member whereby the steering post may be removed from the vehicle for repairs when the steering post is unlocked.

5. The combination with a steering post of a housing, a link removably secured to said housing and non-removably secured to a fixed part of the automobile when the link is secured to the housing, and means for locking the steering post against turning and preventing separation of the link and the housing whereby the steering post may be removed from the vehicle for repairs when the steering post is unlocked.

6. The combination with an adjustable steering post and its bracket of a housing, a link removably secured to said housing as the bracket is adjusted and non-removably secured to a fixed part of the automobile when associated with the housing, and key operated means for locking the steering post against turning and preventing separation of the link and the housing.

7. In an automobile, a member fixed with respect to the frame thereof, a housing movable with respect to said member, an adjustable steering post, key operated means within said housing for locking said steering post against turning and locking said housing against movement away from said member.

8. The device of claim 4 in which a connecting link is slidably and removably received in said housing when the post is unlocked and is locked in its place in the housing when the post is locked, said link being held non-removable from said member when the post is locked.

9. In a servicing steering post assembly, a steering post casing, a steering post within said casing, a housing surrounding said casing and permanently secured thereto, a member fixed with respect to the frame of the automobile, a link detachably connecting the fixed member and the housing, and means within said housing for locking the post to its casing and locking said connecting link against removal from either the fixed member or the housing.

10. In a servicing steering post assembly, a steering post casing, a steering post within said casing, a housing surrounding said casing and permanently secured thereto, a member fixed with respect to the frame of the automobile, means within said housing for locking the post to its casing, a link detachably connecting the fixed member and the housing, being freely slidable in the housing when the post is unlocked, and means movable with the locking means for barring removal of the link from the housing when the post is locked 11. In combination, a housing, a locking bolt within said housing, a key operated cylinder, a cam on said cylinder for moving said bolt in one direction, a spring pressed plunger movable in a direction parallel to the axis of said cylinder, a member on said plunger lying in the path of the cam when the plunger is not depressed and engaging beneath the cam when the bolt is in locked position, a link slidably and removably received in the housing when said bolt is in unlocked position and held against withdrawal from the housing by said member when the plunger is held in depressed position by said cam.

12. In a key operated, revolving barrel, coincidental lock for adjustable steering posts, a housing surrounding said adjustable steering post, a spring-pressed bolt slidable in said housing and adapted to lock said post against rotation about its axis, a member resiliently held in position to prevent movement of the means for advancing the bolt to steering post locking position, spring-pressed, manually operated means for moving said member out of said position, a connecting link movable with respect to said housing and secured to a fixed portion of the automobile, said member in unlocked position of the bolt permitting withdrawal of the link from the housing and in locked position of the bolt preventing withdrawal of the connecting link from the housing.

13. In a steering post locking device, means for locking the steering post to the steering post casing at a point between the floor and the steering wheel and further means operable while the first means is in locked position for preventing rotation of the steering post when the steering post casing is severed between the first means and the bottom of the steering post and means for controlling movement of the two means.

14. In a steering post locking device, a housing fast to the steering post casing, means within the housing for locking the steering post to the steering post casing and to the housing, and further means operable when the post is locked to the casing for preventing rotation of the housing about the axis of the steering post when the steering post casing is severed below the housing and key controlled means for controlling movement of the two means.

15. In a vehicle, a shaft that has motion when the vehicle is being driven, a relatively stationary member in proximity thereto cooperating with said member, means secured in a substantially permanent manner to the body of the vehicle for holding the shaft against movement, means for holding the shaft against movement when the relatively stationary member is detached from its mooring in any manner as by being severed between its base and said first means, and key controlled means for simultaneously moving both holding means to inoperative position to place the vehicle in driving condition.

In testimony whereof I affix my signature.

CHARLES N. FAIRCHILD.